May 10, 1960 L. J. GRESHEL ET AL 2,936,341

MULTILINE TELEPHONE SUBSTATION SET

Filed March 4, 1957 7 Sheets-Sheet 1

INVENTOR.
LEONARD J. GRESHEL
JAMES M. ROBINSON
PER O. DAHLMAN
BY
Brown Jackson Boettcher & Dienner May 10, 1960 L. J. GRESHEL ET AL 2,936,341

MULTILINE TELEPHONE SUBSTATION SET

Filed March 4, 1957 7 Sheets-Sheet 2

INVENTOR.
LEONARD J. GRESHEL
JAMES M. ROBINSON
PER O. DAHLMAN
BY
[signature]

MULTILINE TELEPHONE SUBSTATION SET
Filed March 4, 1957 7 Sheets-Sheet 3
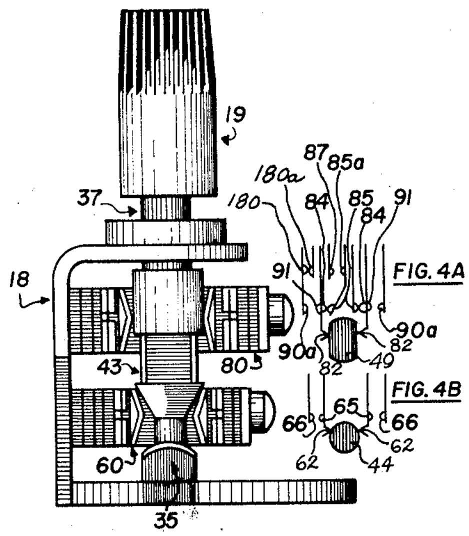
FIG. 4A FIG. 4B
FIG. 4
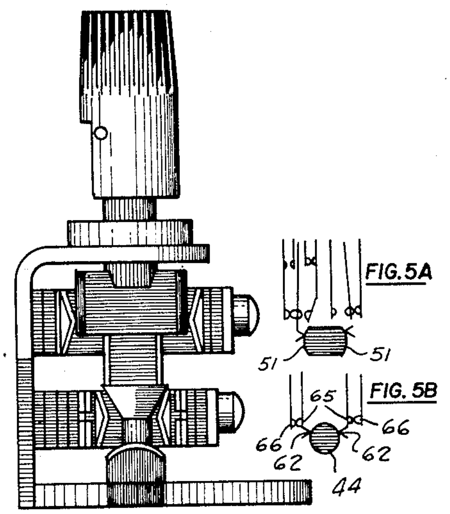
FIG. 5A FIG. 5B
FIG. 5
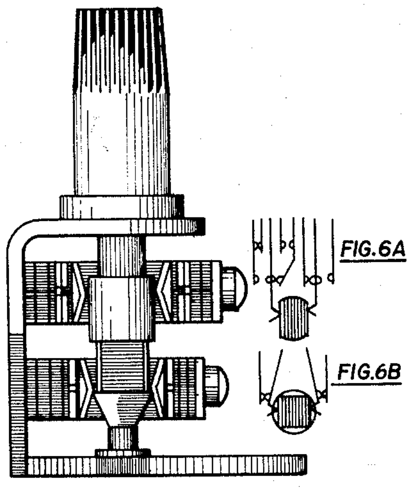
FIG. 6A FIG. 6B
FIG. 6
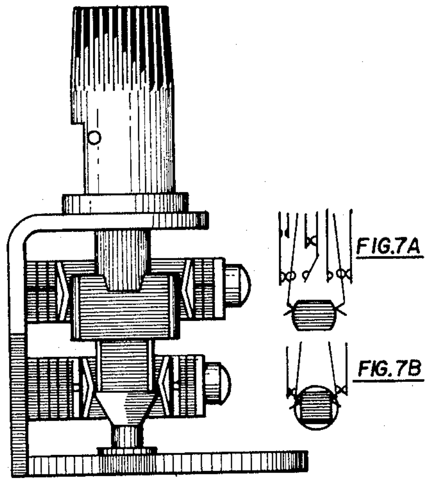
FIG. 7A FIG. 7B
FIG. 7
INVENTOR.
LEONARD J. GRESHEL
JAMES M. ROBINSON
PER O. DAHLMAN
BY
Baum Jackson Battken & Dummer

MULTILINE TELEPHONE SUBSTATION SET

INVENTOR.
LEONARD J. GRESHEL
JAMES M. ROBINSON
PER O. DAHLMAN
BY

INVENTOR.
LEONARD J. GRESHEL
JAMES M. ROBINSON
PER O. DAHLMAN
BY Brown Jackson Boettcher & Dienner May 10, 1960 L. J. GRESHEL ET AL 2,936,341

MULTILINE TELEPHONE SUBSTATION SET

Filed March 4, 1957 7 Sheets-Sheet 6

INVENTOR.
LEONARD J. GRESHEL
JAMES M. ROBINSON
PER O. DAHLMAN
BY

MULTILINE TELEPHONE SUBSTATION SET

INVENTOR.
LEONARD J. GRESHEL
JAMES M. ROBINSON
PER O. DAHLMAN
BY Brown Jackson Boettcher & Dienner United States Patent Office 2,936,341
Patented May 10, 1960

2,936,341

MULTILINE TELEPHONE SUBSTATION SET

Leonard J. Greshel, James M. Robinson, and Per O. Dahlman, Galion, Ohio, assignors to North Electric Company, Galion, Ohio, a corporation of Ohio Application March 4, 1957, Serial No. 643,850

10 Claims. (Cl. 179—99)

This invention relates generally to switch mechanisms for controlling electrical circuits, and more particularly to manually operated contact devices for controlling multiple communication circuits, particularly telephone circuits.

Previous to the present invention, manually operable circuit control switches have been provided wherein a key means is rotatably or slidably actuated to control multiple sets of contacts and communication circuits associated therewith.

The present invention seeks to improve over such prior known devices by providing an improved structure and mechanism for controlling a plurality of communication circuits in a new and improved manner. The present invention is further particularly adapted for use with telephone substations having a handset of familiar construction. Generally, the improved switch of this invention seeks to enable a user of a telephone subset to connect the receiver and transmitter therein to plural communication circuits individually and simultaneously, as selected. Additionally, the switch of this invention is so constructed and arranged as to enable the user, in instances where two line circuits are involved, to hold one line circuit while transmitting over an additional line circuit, to provide a conference hook-up whereby the user may connect the party on one incoming line to the party on a second line while remaining in both circuits, thus to provide a three-way conference arrangement. The above-listed features are generally achieved by providing a structure comprising a bracket, an actuating plunger rotatably and slidably mounted on said bracket and associating therewith plural contact pile-up units, including contact sets, certain of which contact sets are actuated by sliding actuation of the plunger, while other sets thereof are actuated by rotating the plunger. Additional means are included to hold the plunger in a depressed condition at one limit of its sliding motion, while permitting the same to be rotatably moved, as selected. With this arrangement, a first contact means may be closed by rotating the actuating plunger, a second contact means may be closed subsequent thereto by slidingly actuating the plunger without breaking contact through the first contact means, and while in a limit position of longitudinal movement, suitable means are provided to hold the plunger against return longitudinal movement, thereby permitting the user to selectively rotate the plunger to disconnect the first contact means.

One object of this invention is to provide a new and improved multiple circuit control device, especially adapted for use with telephone subscriber sets.

Another object of this invention is to provide a new and improved multiple circuit switch whereby a conventional telephone subscriber set may be converted to permit the user to talk on either of several circuits individually or simultaneously, as selected.

Another object of this invention is to provide cooperating circuitry for achieving the aforesaid operational objects of the multiple circuit switch.

A still further object of this invention is to provide a new and improved multiple circuit switch for use with telephone subsets whereby such may be coupled to at least two line circuits individually and simultaneously and whereby such two line circuits may be coupled to each other, as selected.

Another object of this invention is to provide a new and improved multiple circuit switch embodying an operating plunger device capable of rectilinear sliding and rotational movement and including means for holding such plunger at a limit position of its sliding movement while permitting its rotation thereby to enable simultaneous and selective energization and deenergization of plural electrical circuits associated therewith.

A still additional object of this invention is to provide a new, improved, and simplified manually operative multiple circuit control switch, whereby plural contacting devices requiring distinct manual operations may be coupled in association with a common operator.

The above and further objects, features, and advantages of this invention will appear to those familiar in the art from the following detailed description taken in association with the illustration of a preferred embodiment of this invention as found in the accompanying drawings.

In the drawings:

Figure 4 is an end-elevational view of the assembled switch of this invention, as the same appears in a non-circuit operating condition;

Figure 3:
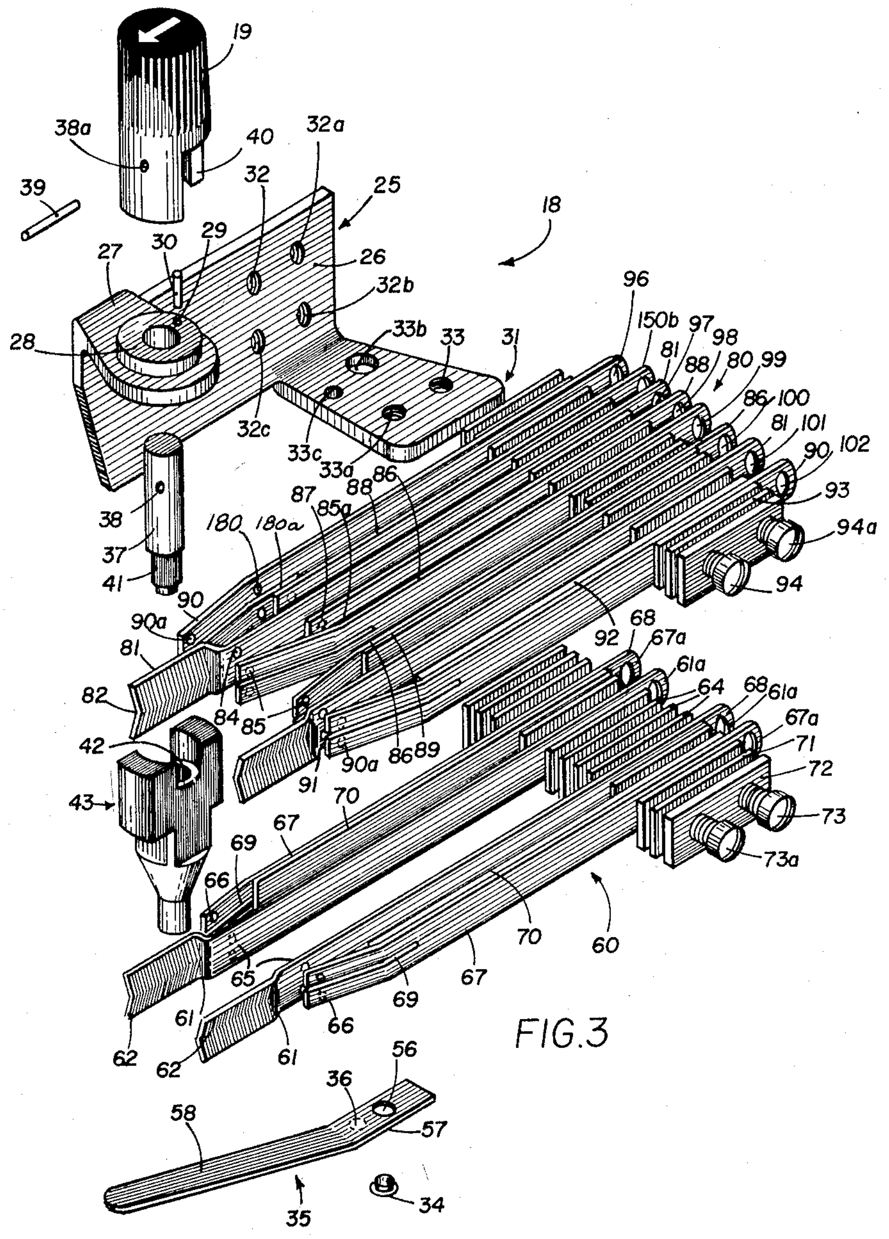
Figure 3 is an exploded, perspective view illustrating the various elements and parts of the improved switch of this invention in their normal relationship for assembly.
Figure 8:
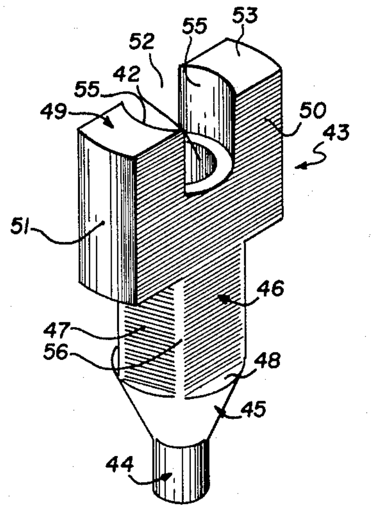
Figure 9:
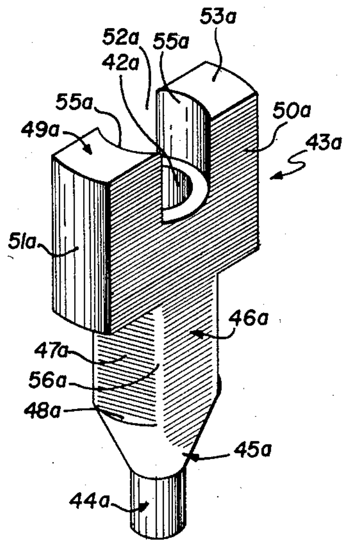
Figure 10:
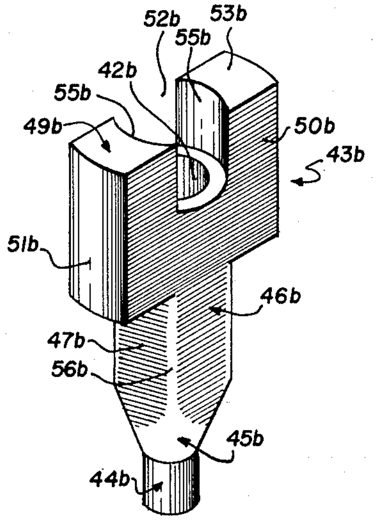
Figure 11:
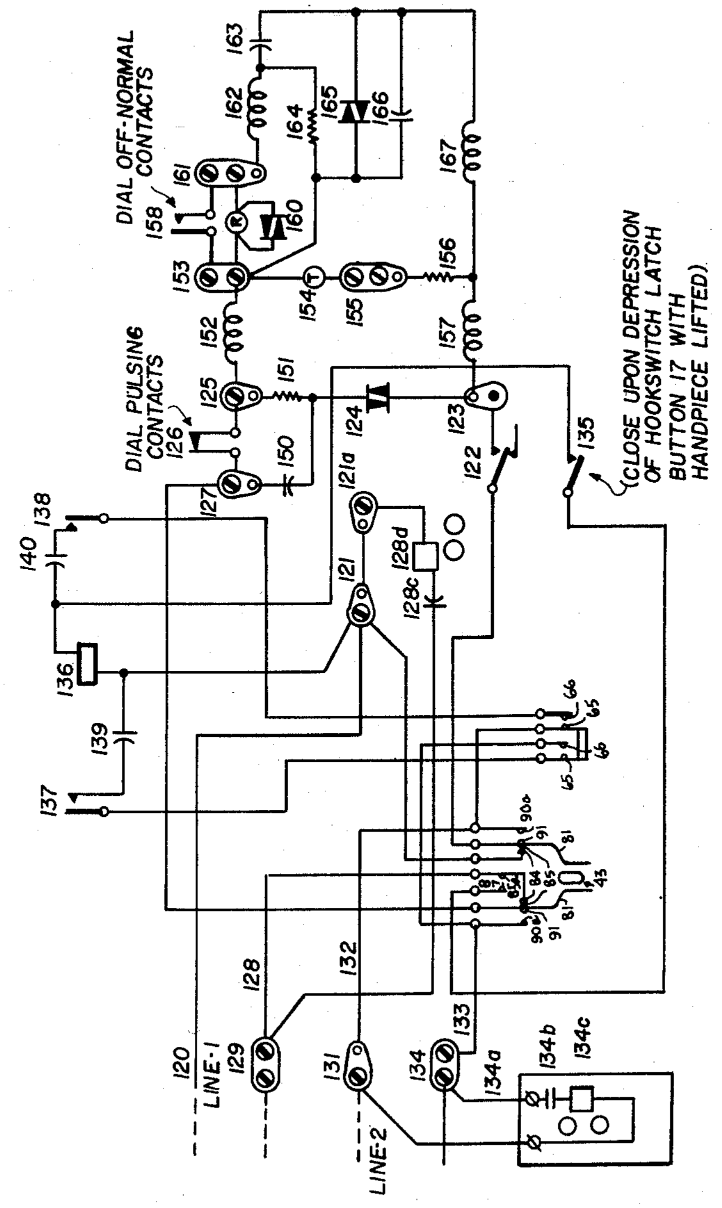
Figure 12:
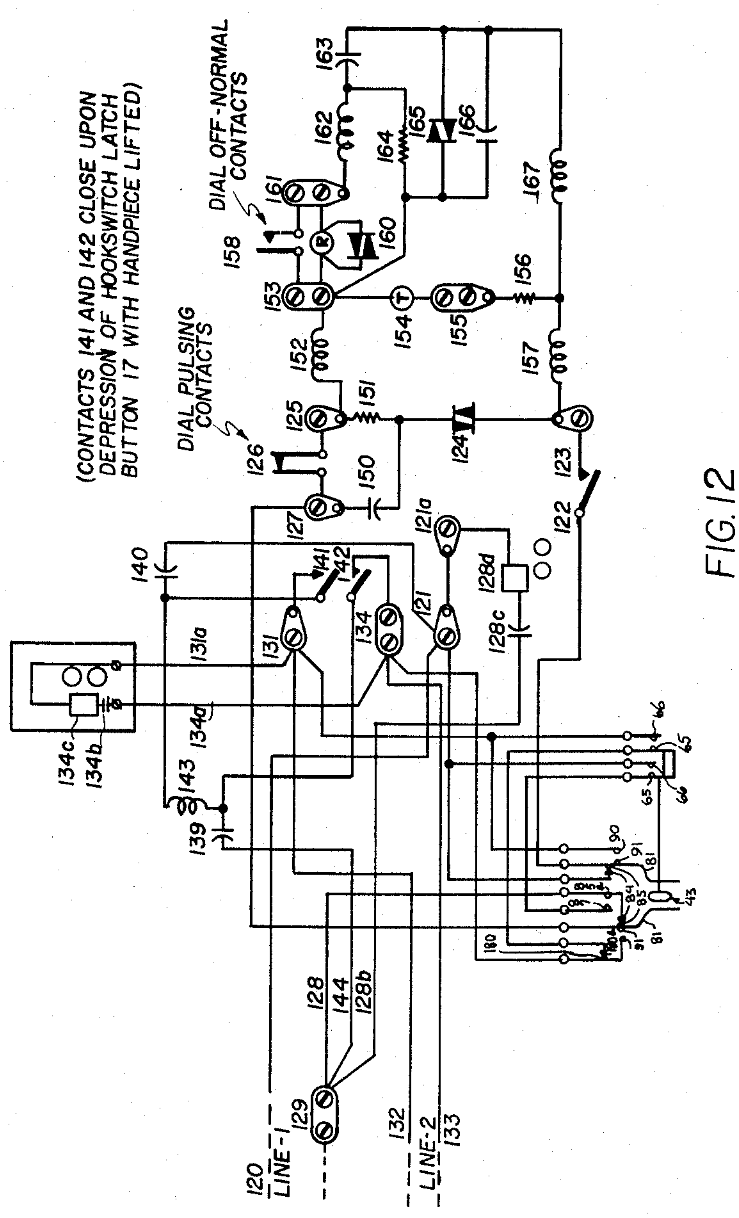
Figure 13:
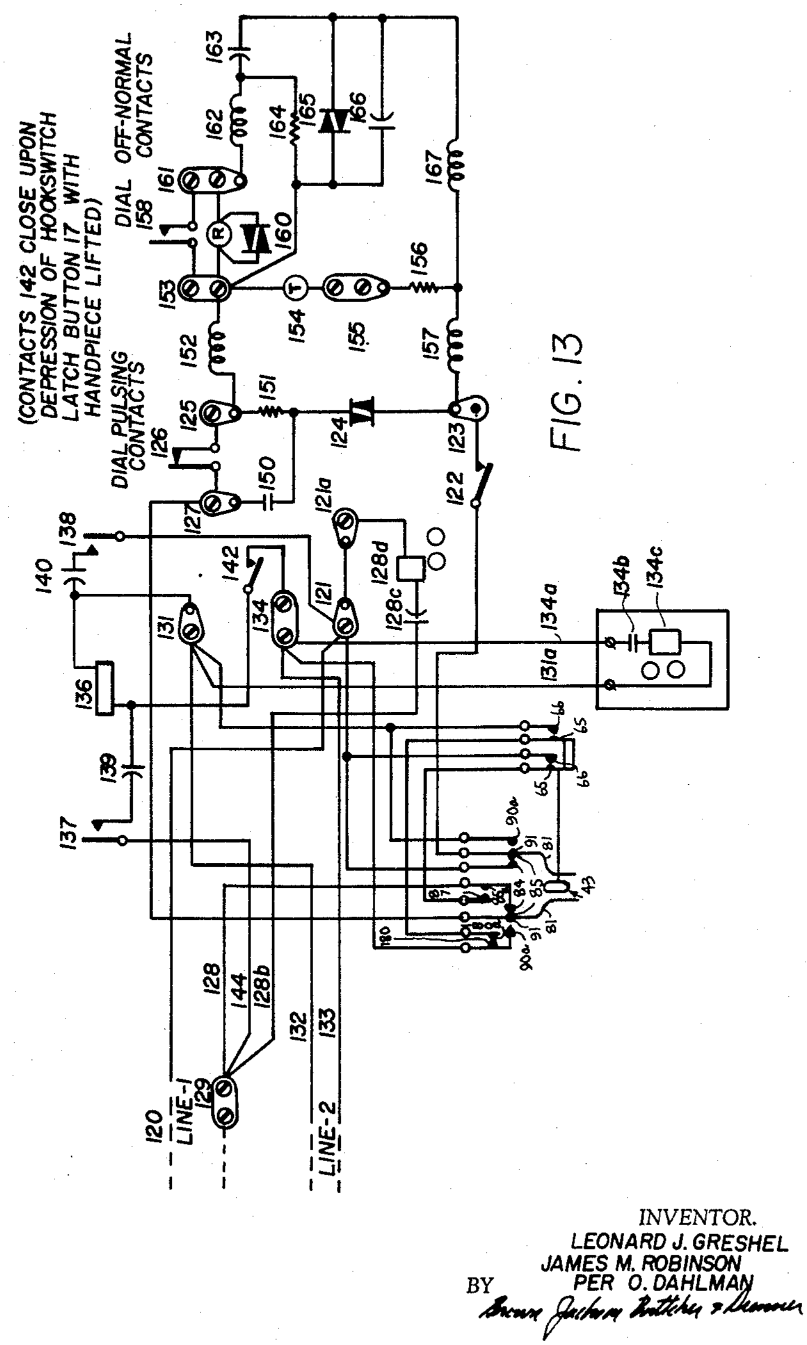

Figure 4*a* is a schematic view taken substantially through the upper contact pile-up of the switch illustrated in Figure 4 to show the condition of the various contact elements associated therewith in a non-operating condition of the switch;

Figure 4*b* is a schematic view, similar to Figure 4*a*, showing the relationship of contact elements associated with the lower contact pile-up of the switch shown in Figure 4;

Figure 5 is an end-elevational view of the improved switch of this invention, similar to Figure 4, showing the same in a first operating position achieved by turning, but not depressing an operating knob;

Figure 5*a* is a schematic view, similar to Figure 4*a*, illustrating the condition of the contacts in the upper contact pile-up according to the operating condition of the switch illustrated in Figure 5;

Figure 5*b* is a schematic view, similar to Figure 4*b*, showing the condition of the contact elements associated with the lower contact pile-up, as they appear in the operating condition of Figure 5;

Figure 6 is an end-elevational view, similar to Figures 4 and 5, showing the switch of this invention in a second operating condition achieved by depressing, but not turning the operating knob;

Figure 6*a* is a schematic view, similar to Figures 4*a* and 5*a*, showing the relationship of the several contact elements in the upper contact pile-up, resulting from the operating condition of the switch shown in Figure 6;

Figure 6*b* is a schematic view, similar to Figures 4*b* and 5*b*, showing the contacts in the lower contact pile-up and their operating position for the operating condition of the switch illustrated in Figure 6;

Figure 7 is an end-elevational view of the improved switch of this invention, similar to Figure 6, showing the same in a third operating position achieved by turning and depressing the operating knob;

Figure 7*a* is a schematic view, similar to Figure 6*a*, showing the relationship of the several contact elements in the upper contact pile-up, resulting from the operating condition illustrated in Figure 7;

Figure 7*b* is a schematic view, similar to Figure 6*b*, showing the relationship of the contacts in the lower contact pile-up, resulting from the operating condition shown in Figure 7;

Figure 8 is a perspective view of one form of operating plunger embodied in the switch of Figure 3 and utilized in the circuitry of Figures 12 and 13, for example;

Figure 9 is a perspective showing, similar to Figure 8, of a first modified form of switch operating plunger useful in the switch of this invention and utilized in the circuitry of Figure 11, for example;

Figure 10 is another perspective showing, similar to Figures 8 and 9, of a second modified form of actuating plunger useful in the switch of this invention; and Figures 11, 12, and 13 are schematic wiring diagrams showing various operational conditions of a telephone subscriber's set in circuit with the improved control switch of this invention.

Figure 1:
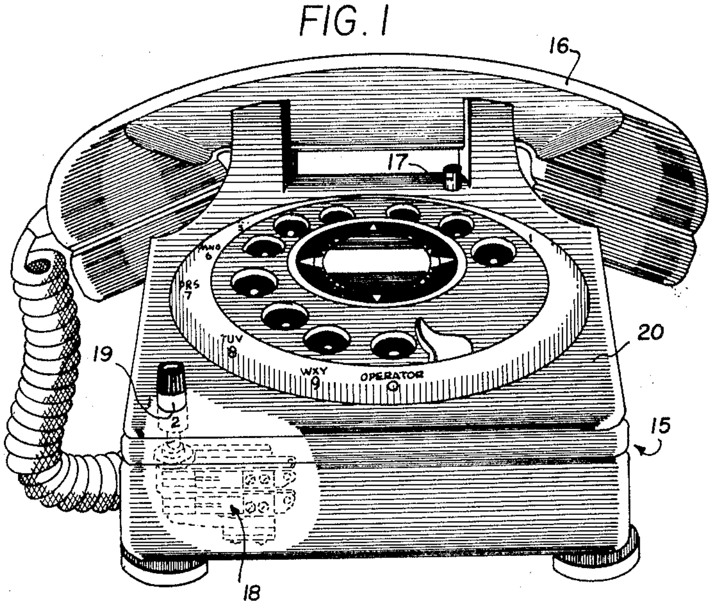
Figure 1 is a front-elevational view of a typical telephone subset and handset in which the improved multiple circuit switch of this invention finds utility.
Figure 2:
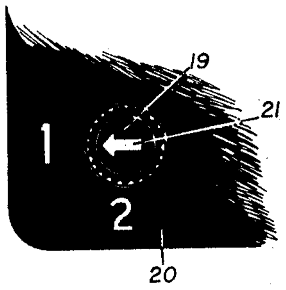
Figure 2 is an enlarged, partial top-plan view of a portion of the subset shown in Figure 1, and illustrating in particular the top plan appearance of manually engageable means of the improved switch of this invention.

Turning now to the mechanical features of the switch of this invention, as shown in the accompanying drawings, it will be recognized from Figure 1 that the same finds particular utility in conjunction with a typical telephone subset 15 equipped with a handset 16 of known design. Subset 15 is further equipped with a manually operative hookswitch latch, indicated generally by numeral 17, which cooperates with a hookswitch (not shown). The improved switch assembly of this invention is shown in broken lines in Figure 1, and is indicated generally by numeral 18 therein, the same including a manually engageable operating knob 19 available exteriorly of the subset housing 20 and workable against index means, such as the numerals (1) and (2) on the upper face of housing 20. The latter relationship may be understood best by examining Figure 2, for example, wherein operating knob 19 is shown in greater detail as including an index pointer 21, capable of being indexed against the numerals appearing on the upper face of housing 20.

In general, the switch of this invention may be termed a "push-and-twist" switch, since the same is operated by manually pushing and twisting the operating means 19, in order to produce corresponding rectilinear and rotational movement of an actuating means associated therewith, as will appear presently.

The features of the switch assembly 18 may best be recognized from examining the exploded, perspective view, Figure 3, where its elements are shown in position for assembly, but separated. Basically, the various elements of the switch assembly are carried on a metal bracket member 25, having a planar base portion 26 from one upper corner of which extends a first ear portion 27, containing a cylindrical bearing ring 28. Ring 28 extends through the ear portion 27 via a suitable opening in the latter and is additionally provided with a small bore 29 adjacent its periphery for receiving a vertical stop pin 30, which extends upwardly from the upper face of the bearing ring 28.

Bracket means 25 further includes a platform portion 31 extending transversely to the plane of base plate 26 in parallelism with ear 27 and at a diametrically opposed corner of such base plate. The base plate contains four threaded openings 32, **32*a*, 32*b*, and 32*c*, while the platform portion 31 contains four similar openings 33, 33*a*, 33*b* and 33*c* being of different size and unthreaded. Openings 33 and 33*a* are for the purpose of mounting the bracket 25 to a suitable support within the confines of the subset housing 20, while opening 33*b* receives rivet member 34 associated with a leaf spring element 35 bearing a locating boss 36; the latter being adapted to enter the smaller opening 33*c***.

Mounted in the bearing ring 28 is a cylindrical shaft 37, having a transverse opening 38 therethrough receptive of a mounting pin 39. Pin 39 extends through a circular opening **38*a* in an operating knob 19 above the bearing ring 28. Thus, knob 19 is fixed to the upper end of shaft 37 and held thereto by means of the pin member 39. With regard to operating knob 19, the same includes a cut-away portion 40 in its lower periphery into which the vertically projecting stop pin 30 extends. This arrangement serves to regulate the rotation of the knob and attached shaft 37 according to the arcuate extent of the opening 40; the lateral edges of opening 40 engaging the stop pin 30 to define limits of arcuate movement for knob 19. The lower end of shaft 37 is suitably fluted as at 41 for insertion into a central axial socket opening 42 formed in an operating plunger 43**.

The operating plunger 43, shown enlarged in Figure 8, comprises an elongated member made of a suitable insulating material and formed with a cylindrical portion 44 at its lower end contiguous with a coaxially aligned inverted frusto-conical portion 45. Formed on top of and contiguous to the frustoconical portion 45 is a rectangular body section 46 having a substantially square cross section; the corners of the rectangular section 46 meeting the circumferential portion of the base at the frusto-conical portion 45. Thus, the corners of portion 46 are slightly cut off by the base circumference of portion 45. It will be noted that the four faces 47 of portion 46 are chamfered at their lines of intersection and are set sufficiently inwardly from the base periphery of the portion 45 to provide shoulder portions 48 which operate as detent means in a manner to be related hereinafter.

Atop and coaxial with the rectangular section 46 is a transverse and generally rectangular portion 49 having opposite parallel side faces 50, 50 which lie flush with two of the opposed side faces 47 of portion 46. The outer end of portion 49 are curved at a constant radius from the central axis of the operating plunger 43 and comprise therefore arcuate segment surfaces, as indicated at 51. A central cylindrical recess or bore 52 is formed inwardly of the upper wall 53 of portion 49; such terminating and communicating with the central bore 42 comprising a socket for the lower end of the operating shaft 37. Bore 52 is defined by arcuate faces 55, 55 paralleling end faces 51, 51 of the rectangular section 49.

It will be recalled that the rectangular section 46 is chamfered suitably at its four corners; such chamfered corners comprising cam faces 56 which work with the exterior face of the frusto-conical portion 45 and the curvilinear end wall faces 51 of the rectangular section 49 in a manner to be described hereinafter. The plunger of Figure 8 is used with the circuitry of Figures 12 and 13.

In assembling the elements thus far described, spring member 35 is fastened to the projecting platform portion 31 by rivet member 34 which extends through openings **33*b* and 56 formed in platform 31 and base portion 57 of the leaf spring respectively. The depending locating boss 36 of spring 35 is received in opening 33*c* to position the spring parallel to the base plate 26. Leaf spring 35, in addition to base portion 57, also includes an extending arm portion 58 which, in the mounted position of the spring, extends beneath the axis of the bearing ring 28 for engaging the cylindrical end portion 44 of actuating plunger 43. Plunger 43, as previously noted, is mounted coaxially of the operating shaft 37 with the fluted end portion 41 of the latter being pressed into socket 42 on the former. The upper end of shaft 37, as previously related, is fitted with operating knob 19 and tied thereto as by pin means 39**.

It will be understood that rotatable manipulation of knob 19 serves to rotate the actuating plunger 43. The length of operating shaft 37 is sufficient to permit limited rectilinear sliding movement of such shaft in the bearing ring 28; the upper limit of this rectilinear movement being such as to maintain interfering engagement between the stop 30 and the cut-out 40 of the operating knob 19.

As stated, spring 35 is positioned for engagement with the lower cylindrical portion 44 of the operating plunger 43 and such is contacted thereby during all movements of the operating plunger. The spring is substantially unflexed when the plunger is disposed in its upper limit of rectilinear movement, but is flexed and biased downwardly when the plunger is thrust to its lower limit of sliding movement; this latter position being determined by engagement of the operating knob with the upper face of the bearing ring 28.

Related with the mounting bracket 25, is a first contact pile-up assembly, indicated generally by numeral 60 and hereinafter termed the "lower pile-up." Such lower pile-up assembly 60, as best viewed in Figure 3, includes a pair of parallel spaced elongated leaf spring elements 61, 61, the outer ends of which are crimped in an angular fashion to provide on each spring element a pair of angularly disposed faces forming a raised rib or ridge 62. Such two leaf elements 61 are suitably separated by a plurality of insulating block members 64, the number of which is dependent on the desired spacing therebetween. Preferably the spacing between the rib portion 62 of these leaf elements is less than the base diameter of the frusto-conical portion 45 on the actuating plunger. Each of the contact leaf elements 61 carries a pair of spaced contacts 65, 65 on the face thereof opposite the rib 62 and adjacent thereto. Such contacts 65 are engageable with corresponding contacts 66, 66 carried at the outer ends of a second pair of leaf elements 67 having a length somewhat reduced over the length of elements 61. Contact leaf elements 67 are disposed in spaced parallelism outwardly of the contact leaf elements 61 and are separated therefrom by means of insulator block member 68. The outer ends of contact leaf elements 67 are slotted at 69 between the two contacts 66, 66 carried thereby, such slot extending inwardly from their outer ends a short distance. Disposed inwardly of each contact leaf 67 and between the same and the adjacent insulator block 68 are secondary leaf members 70 designed to reinforce the spring effect on the leaf element 67 in one direction in a well recognized manner.

The inner ends of the elongated contact carrying leaf elements 61 and 67 each constitute terminal ends receptive of conductor wires, or the like, as at 61*a* and 67*a*. In addition to the separator block 64 and 68 additional separator blocks 71 are provided outwardly of the secondary contact carrying leaf element 67. A metal bearing block 72 is also provided and all the separator or insulating blocks and the leaf elements of the lower pile-up assembly 60 are provided with suitable spaced openings for the passage of a pair of mounting screws 73, 73*a*. Such mounting screws are insulated from the pile-up springs and are threaded into openings 32*b* and 32*c* in the base plate 26. Thus the pile-up is mounted in a position over the spring member 35 so that the lower cylindrical portion 44 of actuating plunger 43 depends between the rib portions 62, 62 of leaf elements 61.

A second pile-up assembly, indicated generally by numeral 80, and called hereinafter the "upper" pile-up assembly, is constructed substantially according to the features and arrangement employed in the lower pile-up assembly 60. Assembly 80 includes a pair of elongated contact leaf elements 81, 81 bearing crimped end portions which present ridge portions 82, 82 similar in all respects to the raised ridges 62, 62 of the previously described leaf elements 61. Each of the leaf elements 81 carries a first set of spaced contacts 84, 84 which are engaged by contacts 85, 85 carried at the outer ends of inwardly adjacent leaf spring elements 86, 86. One of the leaf elements 86 carries a secondary set of contacts 85*a* intermediate its ends for engagement by a set of contacts 87 carried by a foreshortened leaf element 88 lying adjacently parallel thereto and between the same and the associated leaf element 81. Leaf 88 acts as a stiffener for the spring 86, especially when such spring 86 is flexed outwardly in closing contacts 87 and 85*a*. The other leaf element 86 is backed by a suitable reinforcing leaf 89 extending along one side thereof for bolstering its resistance to bending and flexing action in one direction.

Outwardly of the two elongated leaf elements 81 are third contact carrying leaf elements 90, each of which carries a set of contacts 90*a* at its outer end for engaging a corresponding set of contacts 91 disposed on the outer face of the adjacent elongated leaf element 81. One of the leaf elements 90 carries a secondary set of contacts 150 intermediate its ends for engagement by a set of contacts 150*a* carried by a foreshortened stiff leaf element 150*b* lying adjacently parallel thereto and between the same and the associated leaf element 81. The other leaf element 90 is backed by a bolstering leaf 92 to assist the same in resistance to bending in one direction.

The several leaf elements so comprising the upper pile-up assembly 80 are suitably carried between insulating blocks 93 and assembled in a pile-up relationship by means of mounting bolts 94, 94*a* which are respectively threaded into openings 32, 32*a* in the bracket base plate 26. The outer or opposite ends of the several leaf elements 81, 86, 88 and 90 constitute terminal connective ends for the connection of conductor wires as indicated at 96, 97, 98, 99, 100, 101, and 102.

Turning now to the operation of the improved switch of this invention, as illustrated in Figures 4 through 7, it will be understood that the switch as shown in Figure 4 is in a neutral or non-operating condition. In Figure 4*a*, the actuating plunger 43 is disposed, as in Figure 4, with the narrowest dimension of its upper rectangular portion 49 between the spring leaf members 81, 81. Thus, leaf members 81, 81 are substantially unflexed to complete circuit through closed contact pairs 84, 85. Since the actuating plunger 43 is in its raised condition in Figure 4, the inclined slope of the frusto-conical portion 45 and the cylindrical lower end 44 engage the ridge portions 62, 62 of the lower pile-up assembly in such a manner that the elongated leaf spring elements 61, 61 associated therewith lie in an inoperative state. So disposed, as best shown in Figure 4*b*, the pairs of contacts 65, 65 and 66, 66 are separated and remain so until periphery of the frusto-conical portion passes the ridge and portion 46 is disposed between the leaf spring elements 61, 61. It will be seen that in the switch position illustrated in Figures 4*a* and 4*b*, there is sufficient pretensioned flexure of springs 81, 81 and 61, 61 to urge the same against elements 49 and 45, respectively. Thus in Figure 4*a*, pretension of spring 81 causes contacts 84 to normally engage contacts 85, pushing the one leaf spring 86 appropriately to hold contacts 85*a* away from contacts 87.

In Figures 5, 5*a*, and 5*b*, operator knob 19 is shown rotated to bring the operating plunger 43 in a position whereat the ridge portions 82, 82 of the upper pile-up assembly 80 engage cam surfaces 51, 51 of the operating plunger means. Contacts 84 and 85 are thereby separated and contacts 91 on the leaf elements 81 are engaged with the contacts 90*a* on the leaf elements 90. Contacts 150 on the leaf element 90 are separated from contacts 150*a* of leaf element 150*b* by the movement of leaf element 90 away from element 150*b* as contacts 90*a* engage contacts 91. Contacts 85*a* and 87 are also closed by movement of the leaf spring 81 outwardly or away from the intermediate contact carrying leaf elements 86, 86 which permits contacts 85*a* to travel toward contacts 87. The lower contact pile-up remains unchanged from its condition, as shown in Figure 4*b*, even though the actuator 43 has been rotated substantially 90 degrees from the position shown in Figure 4*a*.

From the foregoing, it will be appreciated that rotation of the actuator plunger 43 in its raised or uppermost condition serves to separate both sets of contact elements 84 and 85, the single set of contacts 150 and 150*a*, to close contacts 85*a* with 87, and both sets of contacts 90*a* and 91. This will be understood more readily by comparing the schematic Figures 4*a* and 5*a* showing the transition of the pile-up contacts upon rotation of the operating knob means 19 and the associated actuating plunger 43.

In Figures 6, 6*a* and 6*b* is illustrated an operating condition for the improved switch of this invention in which the rotational position of the actuating plunger 43 is identical with that illustrated in Figure 4 of the drawings. It will be recognized, however, that the plunger 43 has been depressed to a lower position of sliding movement in which the spring means 35 is considerably flexed downwardly. In this respect, note that the extending elongated leaf elements 61—61 of the lower pile-up assembly have been spread apart considerably by the downward movement of the frusto-conical portion 45 of the actuating plunger past the ridge portions 62—62 of leaf springs 61—61. Separation of the contact leaf elements 61—61 serves to establish circuit closing engagement between the contact members 65—65 and 66—66 carried by the respective leaf elements 61 and 67 of the lower contact pile-up assembly. This latter relationship may best be understood by examining Figure 6*b* of the drawings. By depressing knob 19 and actuator 43 accordingly, to separate the elongated contact carrying leaf elements 61—61 of the lower pile-up assembly, the ridge portions 62—62 thereon are disposed inwardly and above the peripheral limits of the base for the frusto-conical portion 45; that is, the ridge portions 62, 62 are engaged by the annular detent forming shoulder 48 thereon. With this arrangement, the actuating plunger is held in a lowered position at which the spring means 35 is substantially flattened or depressed. Spring 35 will remain in such condition until external forces are applied to the operating knob 19 to overcome the holding function of the detent ridge means to release the plunger 43. Faces 47 also serve as limits for ridges 62 after the plunger has been lowered and the ridges have passed the detent shoulder 48. The ridges 62 may or may not engage faces 47, as desired.

While the actuating plunger 43 is in its depressed or lowered operating condition, as illustrated in Figure 6, rotation of plunger 43 by the operator serves to bring the cam surfaces 51 into engagement with the ribs 82 of the upper contact pile-up leaf elements 81, as shown in Figures 7, 7*a* and 7*b*. This activity again establishes circuit making engagement between contacts elements 90*a* and 91, and between contact elements 87 and 85*a*, while separating contacts 150 from contacts 150*a* and 84 from 85. Likewise, circuit remains established between contacts 65 and 66 in the lower contact pile-up (see Figure 7*b*). Without axial movement of the actuating plunger 43 from its Figures 6 or 7 position, rotation of the actuator may take place as desired, returning the same from its Figure 7 position to that of Figure 6 without disengagement of the contacts 65 and 66 in the lower pile-up. Thus, the detent means provided by the annular shoulder 48 and the projecting rib portions 62—62 of the lower contact pile-up assembly is of great convenience in the operation of the present switch, especially in holding the circuits associated with the lower contact pile-up while rotating the actuator 43 to selectively open and close contacts on the upper pile-up.

Thus far, a switch 18 including an actuating plunger 43, as shown in Figure 8 of the drawings, has been described. In that relation, it will be recalled that the plunger 43 includes the annular shoulder 48 at the upper end of a frusto-conical portion 45 which acts in conjunction with the raised ridge portions 62—62 of the lower spring contact pile-up assembly to provide detent means for holding the actuating plunger in a lower position of rectilinear movement, particularly shown in Figures 6 and 7 as related above. It will also be recognized that the annular shoulder 48 merges with the chamfered corners of section 46 so that the detent action is lost at the corners, permitting release of the plunger when the corners engage the ridge portions 62—62 unless knob 19 is purposely held depressed while rotating the plunger.

With particular regard now to Figure 9 of the drawings, a first modified form of actuating plunger designated 43*a* is shown, as including a cylindrical lower end portion 44*a*, a frusto-conical portion 45*a* thereabove, a substantially rectangular central portion 46*a* with chamfered edges, and a transversely related rectangular section 49*a* adapted to engage and actuate the leaf spring elements 81—81 of the upper spring pile-up. The modified actuating plunger 43*a* may be readily substituted for plunger 43, heretofore described, although the same differs therefrom in that the detent shoulder means 48*a* at the junction between the portions 45*a* and 46*a* is present on two sides only. By extending the flush side walls 37*a* thereabove through the base of the frusto-conical portions 48*a*—48*a* on opposite sides of the central rectangular section 46*a* cooperating surfaces without detent shoulders are provided. This style of actuator is intended for use with the circuitry of Figures 12 and 13.

With an arrangement of this order, downward thrusting of the actuating plunger from its Figure 5 to its Figure 6 position will result as before in closing of circuit between contacts 65 and 66 of the lower contact pile-up, but unless the actuating plunger is turned appropriately for the detent shoulders 48*a* thereon to engage the ridges 62 of the contact elements 61, the return force of the spring 35 will serve to return the plunger 43*a* automatically to its Figure 4 position.

In Figure 10 is illustrated a still further modified form of actuating plunger designated 43*b* which differs from the plungers 43 and 43*a* heretofore described in that the detent shoulders have been eliminated. In using the plunger 43*b* no automatic hold-down or detent engagement between the plunger actuator and the spring members of the lower contact pile-up will occur. As a consequence, circuit selection is carried out largely by rotating the actuator plunger 43*b*, while closure of contacts 65 and 66 in the lower contact pile-up is brought about by thrusting the plunger downwardly to separate the leaf spring elements 61, 61 of the lower contact pile-up. In this latter respect, it will be understood that rotation of the actuator 43*b*, when in its lowered condition, will alternately open and close contacts in the upper contact pile-up assembly, while contacts 65 and 66 of the lower contact pile-up will remain closed. A plunger such as 43*b* of Figure 10 is intended for use in conditions where the inward thrust of knob 19 would close a momentary signal circuit. For example, such could be used for actuating a switchboard buzzer signal, or the playback of a dictation machine, etc.

Turning now to the control features of the improved switch of this invention, its use and operation will be readily recognized in conjunction with the circuits of Figures 11, 12, and 13. In regard to such circuits, it should be observed that various plunger and contact modifications may be used, as required.

Figure 11 illustrates a circuit of a substation utilizing the novel push-and-twist switch 18 of this invention, equipped with a plunger of the order shown in Figure 9, a standard hookswitch, and a hookswitch latch to provide two line and conference service to the subscriber. The circuit between terminals 123 and 127 hereinafter called the "common circuit," and consisting of dial impulse contacts 126 in parallel with radio interference suppression capacitor 150, resistor 151, terminal 125, one-half primary winding 152, terminal 153, transmitter 154, and resistor 156 shunted by various other circuit elements and the one-half primary winding 157, plus the shunt path between terminals 123 and 125, which includes the resistor 151 and varistor 124, has been particularly described in United States Letters Patent 2,629,783, issued on February 24, 1953, to H. F. Hopkins, under the title, "Telephone Circuit." Such circuit may be described as the basic talking circuit of the subset, since an audio frequency voltage appearing across the terminals 127 and 123 causes the receiver 159 to produce an acoustic signal of corresponding frequency. Likewise, if suitable D.C. current is made to flow through the carbon transmitter 154 and an acoustic signal is impressed on the diaphragm thereof, an audio frequency voltage will appear across terminals 123 and 127.

The present invention enables the user of the subset to gain access to either of the two telephone lines by switching the said "common circuit" from one line to the other. The user may also initiate calls and converse over said lines in a well-known manner. In subsequent description for brevity in circuit tracing, contacts 122 will also be included in the "common circuit."

As an example, if the subscriber wishes to receive an incoming call on line 1, knob 19 of the push-and-twist switch 18 is aligned with its index arrow 21 pointing to numeral 1. The contacts of switch 18 are then in the position illustrated in Figures 4, 4*a*, and 4*b*. The operating circuit from line 1 is as illustrated in Figure 11 and extends from one side of line 1 over conductor 120, terminal 121, various contacts of the control switch assembly 18, through the common circuit between terminals 123 and 127, contacts 84 and 85 of the push-and-twist switch 18, conductor 128, and terminal 129 to the other side of line 1. Accordingly, with the switch 18 in this condition, a call can be made over, or received, from line 1.

The ringer circuit from line 1 can be traced from conductor 120, terminals 121 and 121*a*, ringer 128*d*, condenser 128*c*, conductor 128*b*, and terminal 129 at the other side of the line. If a ringer is desired for line 2, a ringer box comprising a ringer 134*c* and condenser 134*b* can be attached by conductors 134*a* and 131*a* to terminals 134 and 131 associated with line 2, as seen in Figure 11.

If it is desired to make or receive a call on line 2, the selector knob of the push-and-twist switch is rotated through 90 degrees so that the index arrow points toward numeral 2. This serves to displace various contacts of the switch, as illustrated in Figures 5, 5*a*, and 5*b*. Accordingly, an operating circuit for line 2 is established, the circuit extending over terminal 131 (Figure 11), conductor 132, one set of contacts 90*a* and 91 of the push-and-twist switch, the "common circuit" 130, the other set of contacts 90*a* and 91, conductor 133, and terminal 134 to the other side of line 2. Such an operating circuit permits the subscriber to make or receive calls over line 2.

According to one feature of the invention, it is possible for the subscriber to make or receive a call incoming on line 2, while holding another call on line 1. In preparation to complete the hold circuit for line 1, the hookswitch latch (Figure 1) is released before shifting to line 2 by depressing the hookswitch latch button 17 and thereby closing contacts 135 (see Figure 11). It should be understood that hookswitch contacts 135 do not close when the receiver is lifted from the cradle, but are closed by subsequent manual depression of the hookswitch latch button 17. This action prepares to hold line 1.

When the knob 19 is turned to the line 2 position, a holding circuit for line 1 is then established from one side of the line over conductor 120, terminal 121, the winding of relay 136, hookswitch contacts 135, switch contacts 85*a* and 87, conductor 128, and terminal 129 to the other side of line 1. This position of the switch contacts is illustrated in Figure 5 of the drawings. When the subscriber has completed the call on line 2, and wishes to pick up the call being held on line 1, the knob 19 of push-and-twist is rotated to the line 1 position, thus breaking the holding circuit by opening contacts 87 and completing the above-described operating circuit for line 1. Incident to replacement of the handset, the hookswitch latch is reset, thereby opening contacts 135.

It is noted that relay 136 is operated as a part of the holding circuit for line 1. However, such operation, although effective to close contacts 137 and 138, does not complete any circuits thereby, because contacts 65 and 66 are open at this time.

Instead of terminating the call incoming on line 2 to pick up the call being held on line 1, the subscriber at substation 1 may wish to establish a three-way conference connection between line 1, line 2, and the substation 1. The hookswitch latch button 17 has already been depressed to close contacts 135 and complete the holding circuit on line 1, as described above. In accordance with the invention, the subscriber has only to depress knob 19 of the push-and-twist switch to effect such a conference connection. When the selection switch is in the "line 2" position, such depression of knob 19 effects closure of both sets of contacts 65, 66 accompanied by locking the switch in this condition through the activity of ridges 62 and the detent shoulder of the plunger of the form shown in either Figure 8 or 9 to complete the conference arrangement. Line 1 is thus connected to line 2 through capacitors 139 and 140; one side of line 1 being connected to one side of line 2 over the circuit extending from conductor 120, terminal 121, capacitor 139, contacts 137 (relay 136 being operated in response to the closure of contacts 135), one set of contacts 65, 66, conductor 133, and terminal 134 to one side of line 2.

The other side of line 1 is connected over terminal 129, conductor 128, switch contacts 85*a* and 87, contacts 135, capacitor 140, contacts 138, the other set of contacts 65 and 66, conductor 132, and terminal 131 to line 2. In this manner, the conference is effected with a minimum of additional circuitry by the depression of a single operating knob. If it is desired, after a conference, to drop line 2 and talk on line 1, the caller simply turns the depressed control knob 19 to the line 1 position thereby opening contacts 85*a* and 87 which remove the artificial hold from line 1 and transfer previously described contacts from line 2 to line 1. In this condition, absence of the detent ridge in the line 1 position, when using a plunger of the type shown in Figure 9, for instance, will permit automatic return or raising action of the operating knob 19 when pressure is released therefrom, thus opening the conference contacts 65 and 66 automatically. If the plunger 43, as illustrated in Figure 8, is employed, however, positive return action must be imposed on the operating knob to disengage the detent ridge 48 thereon from the ridges 62.

Alternately, if during or after conference, it is desired to hold line 1 and talk privately on line 2, the caller retains the operating knob 19 at its line 2 position and simply pulls knob 19 outwardly. This opens contacts 65 and 66 which control the transmission paths to line 1. It should be observed that with the hookswitch contacts 135, and contacts 85*a* and 87 still closed, line 1 is held. If it is then desired to reestablish the conference, the caller depresses knob 19 which is still in the line 2 position. This closes contacts 65 and 66 to reconnect the transmission circuits of line 1. It will be noted that contacts 135, 85*a*, and 87 remain closed to hold line 1.

After the conference call, as just described, instead of depressing the operating knob 19, the same may be turned to a line 1 position, opening contacts 85*a* and 87 which in turn open the artificial hold on line 1 and open contacts 90*a* and 91. This releases line 2 and closes contacts 84—85 to reestablish normal connection to line 1.

The basic push-and-twist switch structure, as illustrated in Figures 1 through 7 of the drawings, may include additional contacts, such as contacts 180 and 180*a* of the switch circuitry illustrated in Figure 12. Such a modification requires the use of a hookswitch having an extra set of contacts 141. Also, a coil 143 is used instead of relay 136. Such a modification permits the subscriber utilizing a subset 1 to make or receive a call on line 1 while line 2 is being held, and alternatively permits reception of a call on line 2 while holding line 1.

In greater detail, if the subscriber of substation 1, having a switch structure and circuitry as illustrated in Figure 12, receives a call over line 1, the operating circuit is completed for one side of line 1 over conductor 120, terminal 121, one set of contacts 84, 85, the common operating circuit 130, the other set of contacts 84, 85, conductor 128, and terminal 129 to the other side of line 1. An operating circuit to make or receive a call on line 2 may be completed by rotating knob 19 to the line 2 position. This completes a circuit extending from one side of line 2 over conductor 132, terminal 131, contacts 90*a* and 91, the common operating circuit, the other set of contacts 90*a* and 91, terminal 134, and conductor 133 to the other side of line 2. It is apparent that the operating circuits for making and receiving incoming calls on both lines 1 and 2 are similar to those illustrated and described in association with Figure 11.

The hold circuits in Figure 12 differ from the hold circuits of Figure 11 through the use of contacts 65 and 66 in the lower pile-up assembly to achieve the hold circuit completion. That is to say, if the subscriber wishes to hold a call on line 2 and use line 1, knob 19 is depressed in its line 2 position to close contacts 65 and 66 to hold line 2. The knob is then turned to its line 1 position. The plunger of Figure 8 is preferred in this circumstance and ridges 62 are held locked with shoulder 48 in either of its positions (line 1 or line 2); the operator holding the knob 19 down as he turns the same to avoid release of the chamfered corners as such come opposite ridges 62. Thus, the hold circuit for line 2 is completed from one side of line 2 over conductor 132, terminal 131, contacts 65 and 66, contacts 180 and 180*a*, terminal 134, and conductor 133 to the other side of line 2. Similarly, a holding circuit for line 1 may be establishing by depressing the operating knob 19 and turning the same to the line 2 position. Circuit is then completed from one side of line 1 over conductor 120, terminal 121, the other set of contacts 65, 66 contacts 85*a*—87, conductor 128, and terminal 129 to the other side of line 1. In this manner, the apparatus illustrated in Figure 12 permits holding of either line while the subscriber is making or receiving calls on the other line.

The substation circuitry illustrated in Figure 12 is likewise useful in setting up a threeway conference connection between the subscriber of substation 1 and the parties utilizing lines 1 and 2. To effect such a conference arrangement, the subscriber of substation 1 depresses the hookswitch latch button 17 when knob 19 is in the line 2 position. Depression of the hookswitch latch button 17 effects closure of contacts 141 and 142 which is effective to connect impedance coil 143 across line 2. Such connection comprises a circuit extending along one side of line 2 over conductor 132, terminal 131, contacts 141, impedance coil 143, contacts 142, terminal 134, and conductor 133 to the other side of line 2. Closure of contacts 141 and 142 also serves to connect line 1 to line 2. Such connection extends from one side of line 1 over conductor 120, terminal 121, capacitor 140, contacts 141, terminal 131, and conductor 132 to one side of line 2. The other side of line 1 is connected over terminal 129, conductor 144, capacitor 139, contacts 142, terminal 134, and conductor 133 to the other side of line 2. After the impedance coil 143 has been connected across line 2, and the two lines have been connected by the capacitors 139 and 140, the knob 19 may be rotated to its line 1 position and released to spring upwardly thereby completing the conference connection between three parties, the same connecting line 1 to the common circuit 130 via contacts 84 and 85.

After a conference call utilizing the structure illustrated in Figure 12 is completed, both lines are released and a hookswitch latch is restored to permit reception of the next call in the normal manner. It is to be noted that the hookswitch illustrated in Figure 12 requires one additional contact 141 more than the usual number. With reference to Figure 12, several alternate operations are available.

The conference position finds the operating knob 19 in the line 1 and axially outermost condition. In this position, line 2 is held by impedance coil 143 of Figure 12 through the hookswitch latch contacts 141 and 142. These contacts also provide an A.-C. path between lines 1 and 2.

Private conversation can be obtained with line 1 only, during conference, by depressing knob 19 to place a direct short through contacts 65, 66, and 180, 180*a* across line 2, thus using the normal hold for line 2 as a short circuit. Now if it is desired to talk privately on line 2, knob 19 is turned (in its depressed condition) to line 2, thus removing the shunt through contacts 65, 66, and 180, 180*a* and placing a shunt through contacts 65, 66, 85*a* and 87 across line 1. If it is then desired to return to conference condition, knob 19 may be turned to the line 1 position, allowing the same to pop out as the corners of the chamfered edges thereon engage ridges 62. This automatically opens contacts 65, 66 and disables the shunt hold circuits for both lines 1 and 2. It shoud be noted, in particular, that the hookswitch latch contacts 141 and 142 remain closed until replacement of the handset on its cradle occurs.

Modification of the circuit of Figure 12 may be effected, as shown in Figure 13, to permit use of a conventional hookswitch and contact arrangement. The substation circuit illustrated in Figure 13 is similar to that shown in Figure 12, except that impedance coil 143 is replaced by relay 136 having contacts 137 and 138. With operating knob 19 in a depressed line 2 position, while holding line 1, the subscriber depresses and releases the hook-switch latch button 17 which operates contacts 142. As a result of closing such contacts 142, relay 136 operates over the circuit from one side of line 2 over conductor 132, terminal 131, the windings of relay 136, contacts 142, terminal 134, and conductor 133 to the other side of line 2. Relay 136 closes contacts 137 and 138 thereby connecting line 1 to line 2 through capacitors 139 and 140. It is to be noted that the construction of Figure 13 permits elimination of one hookswitch contact, such as contacts 141 shown in Figure 12. Thus the circuitry of Figure 13, by using a relay 136 instead of coil 143, permits the use of a standard hookswitch with latch contacts in a two line conference telephone substation arrangement. Alternative operations are accomplished by manipulating operating knob 19, as described for the circuit of Figure 12. Further numerous applications of the switch, not mentioned herein, might be made, since different types of spring arrangements, including make-and-break contact configurations in combination with various plunger configurations may be employed as desired. It should also be noted that the chamfered corners on the operating plunger allow easier turning movement of the operating knob 19 and its related plunger .

While the present invention has hereinabove been described in association with a preferred and several modified forms of structure and circuitry, it will be readily recognized and appreciated by those familiar in the art that numerous changes, modifications, and substitutions of equivalents may be made therein without necessarily departing from the spirit and scope of the present invention. As a consequence, it is not intended that the present invention be limited to the particulars and specifications herein shown and described, except as may appear in the following appended claims.

It is claimed:

1. A telephone substation including a common operating circuit having transmitting and receiving components and including pairs of input terminals for connecting separate communication lines thereto, a hold circuit for connection to one of said terminal pairs, a first control means, a second control means, means including said first control means for coupling selected ones of said terminal pairs to said common operating circuit in response to a first operation of said first control means, means including said first and second control means for simultaneously coupling one of said terminal pairs to said common operating circuit and for coupling the other of said terminal pairs to said hold circuit in response to operation of said second control means and to a subsequent first operation of said first control means, and means including said first and second control means for providing a common conference connection between both of said terminal pairs and said common operating circuit in response to operation of said second control means and combined first and second operations of said first control means.

2. A telephone substation according to claim 1 in which said second control means includes a standard hookswitch with hookswitch latch arrangement comprising only two sets of contacts.

3. A telephone substation including a common operating circuit having transmitting and receiving components and including pairs of input terminals for connecting separate communication lines thereto, a first control means including a push-and-twist key arranged for both rotating and sliding operation, a second control means including a latch member, a hold circuit disposed for connection to one of said terminal pairs, means including said first control means for selectively coupling said terminal pairs to said common operating circuit in response to rotating operation of said push-and-twist key, means including said first and second control means for simultaneously coupling one of said terminal pairs to said common operating circuit and for coupling the other of said terminal pairs to said hold circuit in response to releasing operation of said latch member and rotating operation of said push-and-twist key, and means including said first and second control means for providing a common conference connection between both of said terminal pairs and said common operating circuit in response to releasing operation of said latch member and both rotation and sliding operation of said push-and-twist key.

4. A telephone substation according to claim 3 in which said means for providing a sommon conference connection includes a relay member operable in response to release of said latch member and both rotation and sliding operation of said key to complete at its contacts the common conference connection between both of said terminal pairs and said common operating circuit.

5. In a telephone substation including a common operating circuit having transmitting and receiving components and having pairs of input terminals for connecting separate communication lines thereto, a pair of hold circuits for selective connection to said terminal pairs, a first control means, a second control means, means including said first control means for selectively coupling either of said terminal pairs to said common operating circuit in response to a first operation of said first control means, means including said first control means for selectively coupling a hold circuit to either of said terminal pairs in response to a second operation of said first control means, and means including both said first and second control means for providing a common conference connection between both of said terminal pairs and said common operating circuit in response to the combined second and first operations of said first control means, the operation of said second control means, and a subsequent return of said first control means to its original condition.

6. A telephone substation including a common operating circuit having transmitting and receiving components and including pairs of input terminals for connecting separate communication lines thereto, a first control means including a push-and-twist key arranged for both rotating and sliding operations, a second control means including a latch member, hold circuits disposed for connection to alternative ones of said terminal pairs, means for selectively coupling selected ones of said terminal pairs to said common operating circuit in response to rotation of said push-and-twist key, means for selectively coupling a hold circuit to either of said terminal pairs in response to sliding operation of said push-and-twist key, and means including said two named control means for coupling said terminal pairs to said operating and hold circuits for providing a common conference connection between both of said terminal pairs and said common operating circuit in response to the combined sliding and rotating operation of said push-and-twist key, release of said latch member, and a subsequent return of said push-and twist key to its original position.

7. A telephone substation according to claim 6 in which said means for providing a common conference connection includes means for coupling impedance means across a terminal pair.

8. A telephone substation according to claim 7 in which said impedance means comprises a relay operative at its contacts to complete said common conference connection, and thereby enabling the use of a standard hookswitch with a hookswitch latch arrangement having only two sets of contacts in said substation.

9. A telephone substation comprising a common operating circuit having transmitting and receiving components and including pairs of input terminals for connecting separate communication lines thereto, a hold circuit, and control means including a push-and-twist key arranged for both rotating and sliding operating movements, said key being operable in response to rotation thereof to selectively couple one of said terminal pairs to said common operating circuit, and being further operable in response to sliding movement thereof to couple said hold circuit to the other of said terminal pairs when either terminal pair is connected to said common operating circuit.

10. A telephone substation including a common operating circuit having transmitting and receiving components and including pairs of input terminals for connecting separate communication lines thereto, a first control means including a push-and-twist key arranged for both rotation and sliding movement, a second control means including a latch member, means for selectively coupling selected ones of said terminal pairs to said common operating circuit in response to rotation of said push-and-twist key, and means for providing a common conference connection between both of said terminal pairs and said common operating circuit in response to release operation of said latch member and combined rotation and sliding movements of said push-and-twist key.

References Cited in the file of this patent

UNITED STATES PATENTS

| | | |
|---|---|---|
| 1,079,533 | Aitken | Nov. 25, 1913 |
| 1,110,027 | Aitken | Sept. 8, 1914 |
| 1,290,645 | Nelson | Jan. 7, 1919 |
| 2,055,920 | Baker | Sept. 29, 1936 |
| 2,280,438 | Matthews | Apr. 21, 1942 |
| 2,622,154 | Deschamps | Dec. 16, 1952 |